United States Patent
Tang (10) Patent No.: US 12,451,173 B2
(45) Date of Patent: Oct. 21, 2025

(54) METHOD FOR NAND FLASH MEMORY TO COMPLETE CONVOLUTION OPERATION OF MULTI-BIT DATA

(71) Applicant: UNIM Innovation (Wuxi) Co., Ltd., Wuxi (CN)

(72) Inventor: Qiang Tang, Wuxi (CN)

(73) Assignee: UNIM Innovation (Wuxi) Co., Ltd., Wuxi (CN)

( * ) Notice: Subject to any disclaimer, the term of this patent is extended or adjusted under 35 U.S.C. 154(b) by 222 days.

(21) Appl. No.: 18/524,840

(22) Filed: Nov. 30, 2023

(65) Prior Publication Data

US 2024/0194230 A1    Jun. 13, 2024

(30) Foreign Application Priority Data

Dec. 13, 2022 (CN) .......................... 202211593371.6

(51) Int. Cl.
| | |
|---|---|
| *G11C 16/10* | (2006.01) |
| *G11C 7/10* | (2006.01) |
| *G11C 7/12* | (2006.01) |
| *G11C 8/08* | (2006.01) |
| *G11C 16/26* | (2006.01) |

(52) U.S. Cl.
CPC .......... *G11C 7/1069* (2013.01); *G11C 7/1096* (2013.01); *G11C 7/12* (2013.01); *G11C 8/08* (2013.01)

(58) Field of Classification Search
CPC ....... G11C 7/1069; G11C 7/1096; G11C 7/12; G11C 8/08; G11C 11/54; G11C 11/5628; G11C 11/5642; G11C 7/1006; G11C 16/0483; G11C 16/08; G11C 16/10; G11C 16/26
See application file for complete search history.

(56) References Cited

U.S. PATENT DOCUMENTS

| | | | | |
|---|---|---|---|---|
| 11,791,840 | B1 * | 10/2023 | Berman ................ | G11C 16/26 714/764 |
| 12,063,786 | B2 * | 8/2024 | Lee ........................ | H10B 51/30 |
| 2022/0398439 | A1 * | 12/2022 | Zhang .................... | G11C 16/10 |
| 2024/0069867 | A1 * | 2/2024 | Yun ........................ | G06F 7/5443 |
| 2024/0193224 | A1 * | 6/2024 | Tang ...................... | G06F 17/15 |
| 2024/0194249 | A1 * | 6/2024 | Tang ...................... | G11C 11/54 |
| 2024/0194271 | A1 * | 6/2024 | Tang ...................... | G11C 11/54 |

\* cited by examiner

*Primary Examiner* — Hien N Nguyen
(74) *Attorney, Agent, or Firm* — ZIEGLER IP LAW GROUP, LLC.

(57) ABSTRACT

Provided is a method for a NAND flash memory to complete convolution operation of multi-bit data, including the following steps: dividing multiple memory cells connected by the same word line into multiple groups of memory cells, writing sub-weight data into the multiple groups of memory cells according to a corresponding relationship between the sub-weight data and sub-feature data, where one group of memory cells only stores one piece of weight data, and one memory cell in one group of memory cells only stores 1-bit data of the sub-weight data; applying a target voltage to the plurality of groups of memory cells through a plurality of word lines; sensing, by multiple corresponding page buffers, currents of memory blocks to obtain multiple pieces of sub-data; and processing the multiple pieces of sub-data to obtain a convolution result. The neural network operation of multi-bit data is achieved using a general NAND flash memory.

9 Claims, 7 Drawing Sheets

METHOD FOR NAND FLASH MEMORY TO COMPLETE CONVOLUTION OPERATION OF MULTI-BIT DATA

FIELD OF TECHNOLOGY

The present disclosure relates to the technical field of NAND flash memories, and in particular to a method for a NAND flash memory to complete convolution operation of multi-bit data.

BACKGROUND

In the prior art, neural network operation is based on NOR memory architecture or ReRAM/PCM memory architecture, which requires a specific memory array structure with different standard memory arrays. In the convolution operation of multi-bit data, a large number of peripheral circuits are needed to support the neural network operation, which is costly and not suitable for mass production.

Therefore, it is necessary to provide a novel method for NAND flash memory to complete convolution operation of multi-bit data to solve the problems above in the prior art.

SUMMARY

An objective of the present disclosure is to provide a method for a NAND flash memory to complete convolution operation of multi-bit data. A general NAND flash memory is used to achieve the neural network operation of multi-bit data.

To achieve the objective above, a method for a NAND flash memory to complete convolution operation of multi-bit data includes the following steps:

S0: providing a NAND flash memory, where the NAND flash memory includes multiple memory blocks and multiple page buffers, each memory block includes multiple synaptic strings, multiple bit lines and multiple word lines, each synaptic string includes multiple memory cells connected in series, the synaptic strings are connected to the bit lines in one-to-one correspondence, the word lines are connected to all the synaptic strings, the page buffers are connected to all the memory blocks, and one bit line is connected to only one page buffer;

S1: weight data including multiple pieces of sub-weight data, where the sub-weight data are m-bit data, m is an integer greater than or equal to 2, feature data including multiple pieces of sub-feature data, where one piece of sub-weight data corresponds to at least one piece of sub-weight data, the sub-feature data are in one-to-one correspondence with the memory blocks, the multiple memory cells connected by the same word line is divided into multiple groups of memory cells, the sub-weight data are written into the multiple groups of memory cells according to a corresponding relationship between the sub-weight data and the sub-feature data, wherein one group of memory cells is configured to only store one piece of sub-weight data, and one memory cell in one group of memory cells is configured to only store 1-bit data of the sub-weight data;

S2: applying a target voltage to the multiple groups of memory cells through the multiple word lines;

S3: sensing, by the multiple corresponding page buffers, currents of the memory blocks, so as to obtain multiple pieces of sub-data; and S4: processing the multiple pieces of sub-data to obtain a convolution result.

The method for a NAND flash memory to complete convolution operation of multi-bit data has the beneficial effects as follows: multiple memory cells connected by the same word line are divided into multiple groups of memory cells, sub-weight data are written into the plurality of groups of memory cells according to a corresponding relationship between the sub-weight data and sub-feature data, one group of memory cells only stores one piece of weight data, and one memory cell in one group of memory cells only stores 1-bit data of the sub-weight data. A target voltage is applied to the multiple groups of memory cells through multiple word lines. Currents of memory blocks are sensed by multiple corresponding page buffers, so as to obtain multiple pieces of sub-data. The multiple pieces of sub-data are processed to obtain a convolution result. The neural network operation of multi-bit data is achieved using the general NAND flash memory.

Alternatively, writing the sub-weight data into the multiple groups of memory cells according to a corresponding relationship between the sub-weight data and the sub-feature data includes:

writing all sub-weight data corresponding to one piece of sub-feature data into different groups of memory cells of the memory blocks corresponding to the sub-feature data according to the corresponding relationship between the sub-weight data and the sub-feature data.

Alternatively, writing the sub-weight data into the multiple groups of memory cells according to a corresponding relationship between the sub-weight data and the sub-feature data further includes: writing the multiple pieces of sub-weight data associated with a result into the plurality of groups of memory cells in which different memory blocks share the multiple bit lines, and writing the same bit data of the multiple pieces of sub-weight data into different memory cells connected to the same bit line, respectively.

Alternatively, the convolution result includes multiple sub-convolution results, and processing the multiple pieces of sub-data to obtain a convolution result includes:

obtaining a sub-convolution result according to multiple pieces of associated sub-data and bit numbers of the multiple pieces of corresponding sub-weight data.

Alternatively, obtaining a sub-convolution result according to multiple pieces of associated sub-data and bit numbers of the multiple pieces of corresponding sub-weight data includes:

multiplying the multiple pieces of associated sub-data and corresponding bit number parameters to obtain multiple pieces of intermediate data, where the bit number parameter is $2^n$, and n is the bit number of the sub-weight data corresponding to the sub-data; and adding the multiple pieces of intermediate data to obtain the sub-convolution result.

Alternatively, the target voltage includes multiple sub-target voltages, the sub-target voltages are in one-to-one correspondence with the sub-feature data, and applying a target voltage to the multiple groups of memory cells through the plurality of word lines includes:

applying the sub-target voltages corresponding to the sub-feature data to all memory cells of the memory blocks corresponding to the sub-feature data, and holding the sub-target voltages through the word lines.

Alternatively, the method for a NAND flash memory to complete convolution operation of multi-bit data further includes the following steps: serving the convolution result as new feature data, repeating Step S1 to Step S3, so as to achieve the next layer of convolution operation.

Alternatively, sensing currents of the memory blocks through multiple corresponding page buffers to obtain multiple pieces of sub-data includes:

dividing sensing time of the page buffer into N sections;
discharging a pre-charge voltage of the page buffer via the bit line until the pre-charge voltage of the page buffer is less than a threshold voltage, and recording the time as an M-th section; and
obtaining sub-data according to M and N, where M and N are natural numbers greater than 0.

Alternatively, the method for a NAND flash memory to complete convolution operation of multi-bit data further includes a target voltage calibration step, which includes the following steps:

writing the threshold voltage into a memory cell matrix with a size of Y×Z in the NAND flash memory, where Y denotes the number of memory cells connected by one bit line, and Z denotes the number of memory blocks;
adjusting a word line voltage, making a measured average current of Y page buffers be X×Z, wherein a word line voltage is X, and corresponding feature data is X; and
obtaining the target voltage according to the word line voltage and the corresponding feature data.

DESCRIPTION OF THE EMBODIMENTS

To make the objectives, technical solutions and advantages of the present disclosure more clearly, the following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure. Unless otherwise defined, technical terms or scientific terms used herein shall have their ordinary meanings as understood by those of ordinary skill in the art to which the present disclosure belongs. As used herein, similar words such as "including" mean that the elements or objects appearing before the word cover the elements or objects listed after the word and their equivalents, but other elements or objects are not excluded.

Figure 1:
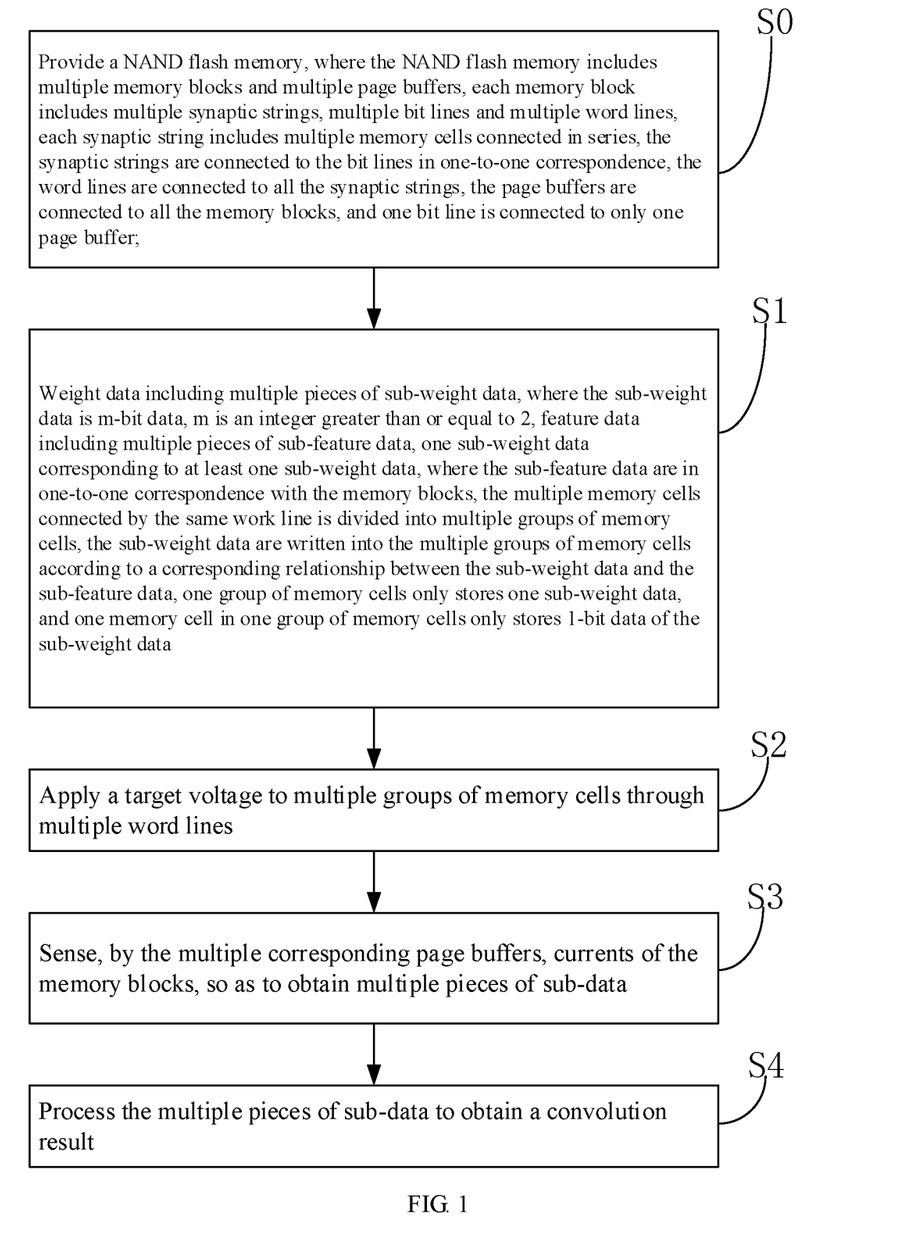
FIG. 1 is a flow chart of a control method for a NAND flash memory to complete neural network operation in some embodiments of the present disclosure.

For the problems in the prior art, a method for a NAND flash memory to complete convolution operation of multi-bit data is provided. Referring to FIG. 1, the method for a NAND flash memory to complete convolution operation of multi-bit data includes the following steps:

S0: providing a NAND flash memory, where the NAND flash memory includes multiple memory blocks and multiple page buffers, each memory block includes multiple synaptic strings, multiple bit lines and multiple word lines, each synaptic string includes multiple memory cells connected in series, the synaptic strings are connected to the bit lines in one-to-one correspondence, the word lines are connected to all the synaptic strings, the page buffers are connected to all the memory blocks, and one bit line is connected to only one page buffer;

S1: weight data including multiple pieces of sub-weight data, where the sub-weight data are m-bit data, m is an integer greater than or equal to 2, feature data including multiple pieces of sub-feature data, where one piece of sub-weight data corresponds to at least one piece of sub-weight data, the sub-feature data are in one-to-one correspondence with the memory blocks, the multiple memory cells connected by the same word line is divided into multiple groups of memory cells, the sub-weight data are written into the multiple groups of memory cells according to a corresponding relationship between the sub-weight data and the sub-feature data, wherein one group of memory cells is configured to only store one piece of sub-weight data, and one memory cell in one group of memory cells is configured to only store 1-bit data of the sub-weight data;

S2: applying a target voltage to the multiple groups of memory cells through the multiple word lines;

S3: sensing, by the multiple corresponding page buffers, currents of the memory blocks, so as to obtain multiple pieces of sub-data; and S4: processing the multiple pieces of sub-data to obtain a convolution result.

In some embodiments, writing the sub-weight data into the multiple groups of memory cells according to a corresponding relationship between the sub-weight data and the sub-feature data includes: writing all sub-weight data corresponding to one piece of sub-feature data into different groups of memory cells of the memory blocks corresponding to the sub-feature data according to the corresponding relationship between the sub-weight data and the sub-feature data.

In some embodiments, writing the sub-weight data into the multiple groups of memory cells according to a corresponding relationship between the sub-weight data and the sub-feature data further includes: writing the multiple pieces of sub-weight data associated with a result into the plurality of groups of memory cells in which different memory blocks share the multiple bit lines, and writing the same bit data of the multiple pieces of sub-weight data into different memory cells connected to the same bit line, respectively.

In some embodiments, the convolution result includes multiple sub-convolution results, and processing the multiple pieces of sub-data to obtain a convolution result includes: obtaining a sub-convolution result according to multiple pieces of associated sub-data and bit numbers of multiple pieces of corresponding sub-weight data.

In some embodiments, obtaining a sub-convolution result according to multiple pieces of associated sub-data and bit numbers of the multiple pieces of corresponding sub-weight data includes:

multiplying the multiple pieces of associated sub-data and corresponding bit number parameters to obtain multiple pieces of intermediate data, where the bit number parameter is $2^n$, and n is the bit number of the sub-weight data corresponding to the sub-data; and adding the multiple pieces of intermediate data to obtain the sub-convolution result.

In some embodiments, the target voltage includes multiple sub-target voltages, the sub-target voltages are in one-to-one correspondence with the sub-feature data, and applying a target voltage to the multiple groups of memory cells through the plurality of word lines includes:

applying the sub-target voltages corresponding to the sub-feature data to all memory cells of the memory blocks corresponding to the sub-feature data, and holding the sub-target voltages through the word lines.

In some embodiments, the method for a NAND flash memory to complete convolution operation of multi-bit data further includes the following steps: serving the convolution result as new feature data, repeating Step S1 to Step S3, so as to achieve the next layer of convolution operation.

Figure 2:
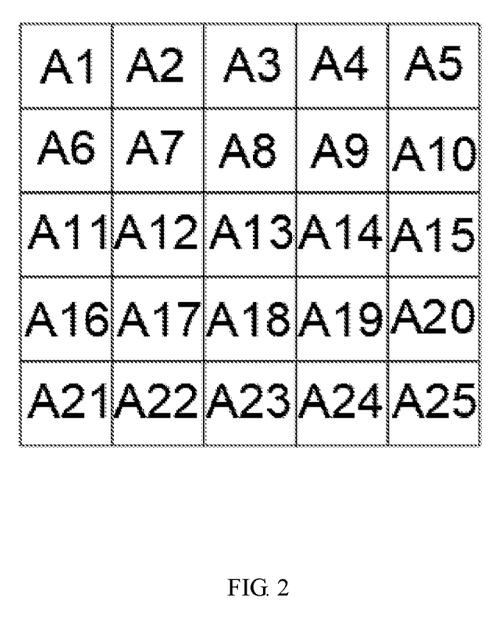
FIG. 2 is a schematic model diagram of feature data in some embodiments of the present disclosure.
Figure 3:
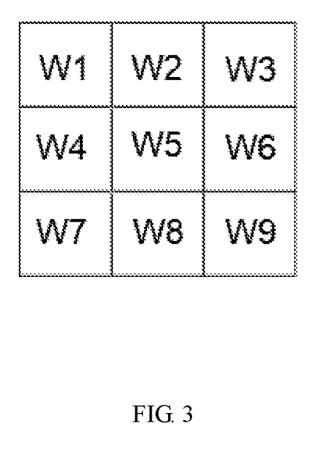
FIG. 3 is a schematic model diagram of weight data in some embodiments of the present disclosure.

FIG. 2 is a schematic model diagram of feature data in some embodiments of the present disclosure. FIG. 3 is a schematic model diagram of weight data in some embodiments of the present disclosure. Referring to FIG. 2 and FIG. 3, A1, A2, A3 through A23, A24 and A25 are the sub-feature data, W1, W2, W3 through W7, W8 and W9 are the sub-weight data.

Referring to FIG. 2 and FIG. 3, the performing of convolution operation includes nine convolution operation processes, which are respectively as follows:

A1×W1+A2×W2+A3×W3+A6×W4+A7×W5+A8×W6+A11×W7+A12×W8+A13×W9, thus obtaining a first sub-convolution result B1;

A2×W1+A3×W2+A4×W3+A7×W4+A8×W5+A9×W6+A12×W7+A13×W8+A14×W9, thus obtaining a second sub-convolution result B2;

A3+A4+A5+A8+A9+A10+A13+A14+A15, thus obtaining a third sub-convolution result B3;

A6+A7+A8+A11+A12+A13+A16+A17+A18, thus obtaining a fourth sub-convolution result B4;

A7+A8+A9+A12+A13+A14+A17+A18+A19, thus obtaining a fifth sub-convolution result B5;

A8+A9+A10+A13+A14+A15+A18+A19+A20, thus obtaining a sixth sub-convolution result B6;

A11+A12+A13+A16+A17+A18+A21+A22+A23, thus obtaining a seventh sub-convolution result B7;

A12+A13+A14+A17+A18+A19+A22+A23+A24, thus obtaining an eighth sub-convolution result B8; and A13+A14+A15+A18+A19+A20+A23+A24+A25, thus obtaining a ninth sub-convolution result B9.

The sub-weight data W1 corresponds to the sub-feature data A1. The sub-weight data W1 and the sub-weight data W2 correspond to the sub-feature data A2. The sub-weight data W1, the sub-weight data W2 and the sub-weight data W3 correspond to the sub-feature data A3. The sub-weight data W2 and the sub-weight data W3 correspond to the sub-feature data A4. The sub-weight data W3 corresponds to the sub-feature data A5. The sub-weight data W1 and the sub-weight data W4 correspond to the sub-feature data A6. The sub-weight data W1, the sub-weight data W2, the sub-weight data W4 and the sub-weight data W5 correspond to the sub-feature data A7. The sub-weight data W1, the sub-weight data W2, the sub-weight data W3, the sub-weight data W4, the sub-weight data W5 and the sub-weight data W6 correspond to the sub-feature data A8. The sub-weight data W2, the sub-weight data W3, the sub-weight data W5 and the sub-weight data W6 correspond to the sub-feature data A6. The sub-weight data W3 and the sub-weight data W6 correspond to the sub-feature data A10. The sub-weight data W1, the sub-weight data W4 and the sub-weight data W7 correspond to the sub-feature data A11. The sub-weight data W1, the sub-weight data W2, the sub-weight data W4, the sub-weight data W5 and the sub-weight data W8 correspond to the sub-feature data A12. The sub-weight data W1, the sub-weight data W2, the sub-weight data W3, the sub-weight data W4, the sub-weight data W5, the sub-weight data W6, the sub-weight data W7, the sub-weight data W8 and the sub-weight data W9 correspond to the sub-feature data A13. The sub-weight data W2, the sub-weight data W3, the sub-weight data W5, the sub-weight data W6, the sub-weight data W8 and the sub-weight data W9 correspond to the sub-feature data A14. The sub-weight data W3, the sub-weight data W6 and the sub-weight data W9 correspond to the sub-feature data A15. The sub-weight data W4 and the sub-weight data W7 correspond to the sub-feature data A16. The sub-weight data W4, the sub-weight data W5, the sub-weight data W7 and the sub-weight data W8 correspond to the sub-feature data A17. The sub-weight data W4, the sub-weight data W5, the sub-weight data W6, the sub-weight data W7, the sub-weight data W8 and the sub-weight data W9 correspond to the sub-feature data A18. The sub-weight data W5, the sub-weight data W6, the sub-weight data W8 and the sub-weight data W9 correspond to the sub-feature data A19. The sub-weight data W6 and the sub-weight data W9 correspond to the sub-feature data A20. The sub-weight data W7 corresponds to the sub-feature data A21. The sub-weight data W7 and the sub-weight data W8 correspond to the sub-feature data A22. The sub-weight data W7, the sub-weight data W8 and the sub-weight data W9 correspond to the sub-feature data A23. The sub-weight data W8 and the sub-weight data W9 correspond to the sub-feature data A24. The sub-weight data W9 corresponds to the sub-feature data A25.

Figure 4:
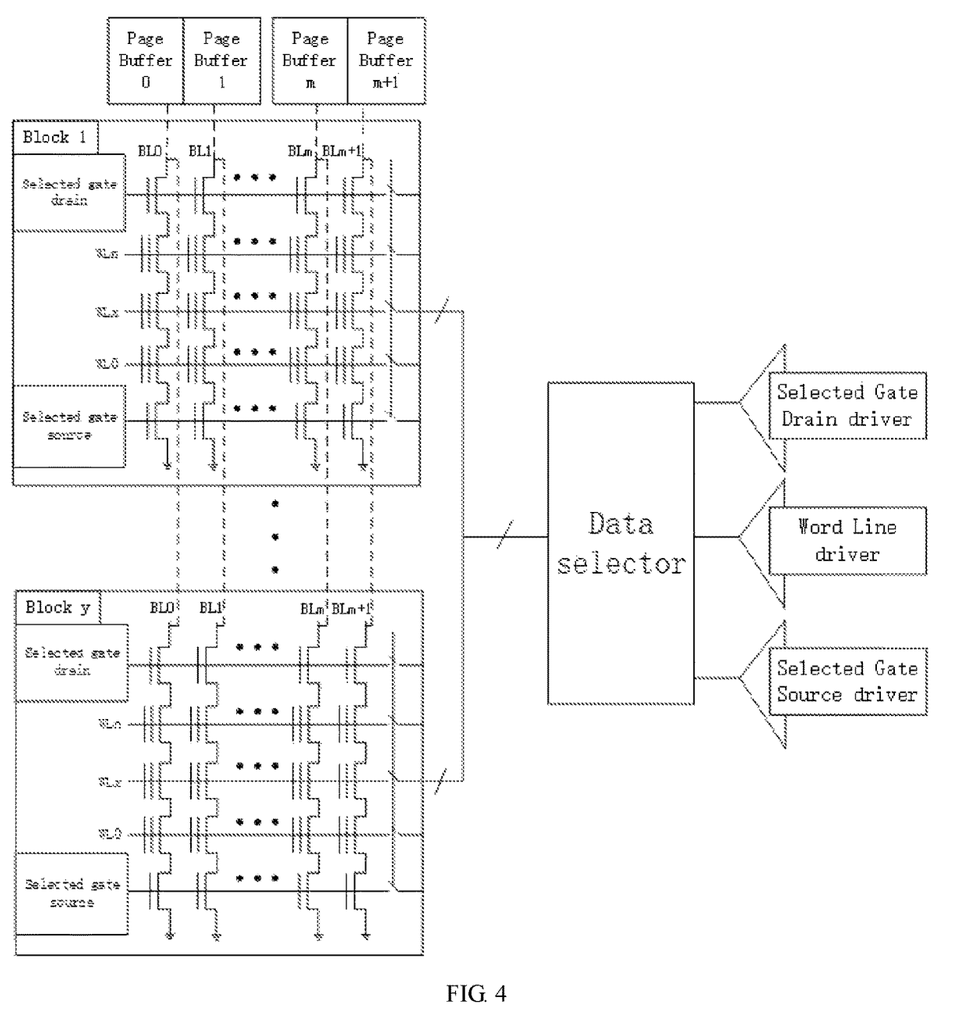
FIG. 4 is a structural schematic diagram of a NAND flash memory in some embodiments of the present disclosure.

FIG. 4 is a structural schematic diagram of a NAND flash memory according to some embodiments of the present disclosure. Referring to FIG. 4, the NAND flash memory includes y memory blocks and m+2 page buffers. Each memory block includes m+2 synaptic strings, m+2 bit lines (BL), three word lines (WL), one selected gate drain (SGD), and one selected gate source (SGS). The synaptic string includes a drain-side gating tube, a source-side gating tube, and three memory cells. The three memory cells are a first memory cell, a second memory cell, and a third memory cell, respectively. The drain-side gating tube, the first memory cell, the second memory cell, the third memory cell and the source-side gating tube are sequentially connected in series. The drain-side gating tube in the first synaptic string is connected to a first bit line BL0, the drain-side gating tube in the second synaptic string is connected to a second bit line BL1, and so on, the drain-side gating tube in the m+1-th synaptic string is connected to a m+1-th bit line BLm, and the drain-side gating tube in the m+2-th synaptic string is connected to a m+2-th bit line BLm+1.

Referring to FIG. 4, the first bit line BL0 of a first memory block block1, the first bit line BL0 of a second memory block through the first bit line BL0 of a y-th memory block are connected to a first page buffer; a second bit line BL1 of the first memory block, a second bit line BL1 of the second memory block through the second bit line BL1 of the y-th memory block are connected to a second page buffer, and so on; the m+1-th bit line BLm of the first memory block, the m+1-th bit line BLm of the second memory block through the m+1-th bit line BLm of the y-th memory block are connected to a m+1-th page buffer, and the m+2-th bit line BLm+1 of the first memory block, the m+2-th bit line BLm+1 of the second memory block through the m+2-th bit line BLm+1 of the y-th memory block are connected to the m+2-th page buffer.

Referring to FIG. 3 and FIG. 4, each of the sub-weight data W1, the sub-weight data W2, the sub-weight data W3, the sub-weight data W4, the sub-weight data W5, the sub-weight data W6, the sub-weight data W7, the sub-weight data W8 and the sub-weight data W9 is 8-bit binary data. 7th-bit data W1_7 of the sub-weight data W1 is written into the second memory cell of the first synaptic string of the first memory block block1, 6th-bit data W1_6 of the sub-weight data W1 is written into the second memory cell of the second synaptic string of the first memory block block1, and so on, 0th-bit data W1_0 of the sub-weight data W1 is written into the second memory cell of the eighth synaptic string of the first memory block block1. The second memory cell of the first synaptic string in the first memory block block1, the second memory cell of the second synaptic string through the second memory cell of the eighth synaptic string form a group of memory cells.

Referring to FIG. 3 and FIG. 4, 7th-bit data W2_7 of the sub-weight data W2 is written into the second memory cell of the first synaptic string of the second memory block, 6th-bit data W2_6 of the sub-weight data W2 is written into the second memory cell of the second synaptic string of the second memory block, and so on, 0th-bit data W2_0 of the sub-weight data W2 is written into the second memory cell of the eighth synaptic string of the second memory block. The 7th-bit data W1_7 of the sub-weight data W1 is written into the second memory cell of the ninth synaptic string of the second memory block, the 6th-bit data W1_6 of the sub-weight data W1 is written into the second memory cell of the tenth synaptic string of the second memory block, and so on, 0th-bit data W1_0 of the sub-weight data W1 is written into the second memory cell of the sixteenth synaptic string of the second memory block.

Referring to FIG. 3 and FIG. 4, 7th-bit data W3_7 of the sub-weight data W3 is written into the second memory cell of the first synaptic string of the third memory block, 6th-bit data W3_6 of the sub-weight data W3 is written into the second memory cell of the second synaptic string of the third memory block, and so on, 0th-bit data W3_0 of the sub-weight data W3 is written into the second memory cell of the eighth synaptic string of the third memory block. 7th-bit data W2_7 of the sub-weight data W2 is written into the second memory cell of the ninth synaptic string of the third memory block, 6th-bit data W2_6 of the sub-weight data W2 is written into the second memory cell of the tenth synaptic string of the third memory block, and so on, 0th-bit data W2_0 of the sub-weight data W2 is written into the second memory cell of the sixteenth synaptic string of the third memory block. The 7th-bit data W1_7 of the sub-weight data W1 is written into the second memory cell of the nineteenth synaptic string of the third memory block, the 6th-bit data W1_6 of the sub-weight data W1 is written into the second memory cell of the twentieth synaptic string of the third memory block, and so on, the 0th-bit data W1_0 of the sub-weight data W1 is written into the second memory cell of the twenty-fourth synaptic string of the third memory block.

Referring to FIG. 3 and FIG. 4, the 7th-bit data W3_7 of the sub-weight data W3 is written into the second memory cell of the ninth synaptic string of the fourth memory block, the 6th-bit data W3_6 of the sub-weight data W3 is written into the second memory cell of the third synaptic string of the tenth memory block, and so on, 0th-bit data W3_0 of the sub-weight data W3 is written into the second memory cell of the sixteenth synaptic string of the fourth memory block. The 7th-bit data W2_7 of the sub-weight data W2 is written into the second memory cell of a seventeenth synaptic string of the fourth memory block, the 6th-bit data W2_6 of the sub-weight data W2 is written into the second memory cell of an eighteenth synaptic string of the fourth memory block, and so on, and the 7th-bit data W2_7 of the sub-weight data W2 is written into the second memory cell of a twenty-fourth synaptic string of the fourth memory block.

Referring to FIG. 3 and FIG. 4, the 7th-bit data W3_7 of the sub-weight data W3 is written into the second memory cell of the seventeenth synaptic string of the fifth memory block, the 6th-bit data W3_6 of the sub-weight data W3 is written into the second memory cell of the eighteenth synaptic string of the fifth memory block, and so on, the 0th-bit data W3_0 of the sub-weight data W3 is written into the second memory cell of the twenty-fourth synaptic string of the fifth memory block.

Referring to FIG. 3 and FIG. 4, 7th-bit data W4_7 of the sub-weight data W4 is written into the second memory cell of the first synaptic string of the sixth memory block, 6th-bit data W4_6 of the sub-weight data W4 is written into the second memory cell of the second synaptic string of the sixth memory block, and so on, 0th-bit data W4_0 of the sub-weight data W4 is written into the second memory cell of the eighth synaptic string of the sixth memory block. The 7th-bit data W1_7 of the sub-weight data W1 is written into the second memory cell of the twenty-fifth synaptic string of the sixth memory block, the 6th-bit data W1_6 of the sub-weight data W1 is written into the second memory cell of the twenty-sixth synaptic string of the sixth memory block, and so on, the 0th-bit data W1_0 of the sub-weight data W1 is written into the second memory cell of the thirty-second synaptic string of the sixth memory block.

Referring to FIG. 3 and FIG. 4, the sub-weight data corresponding to the feature data A7, the feature data A8, the feature data A9, the feature data A10, the feature data A11, the feature data A12, the feature data A13, the feature data A14, the feature data A15, the feature data A16, the feature data A17, the feature data A18, the feature data A19, the feature data A20, the feature data A21, the feature data A22, the feature data A23, the feature data A24 and the feature data A25 are respectively written into the memory cells corresponding to the seventh storage block, the eighth storage block, the ninth storage block, the tenth storage block, the eleventh storage block, the twelfth storage block, the thirteenth storage block, the fourteenth storage block, the fifteenth storage block, the sixteenth storage block, the seventeenth storage block, the eighteenth storage block, the nineteenth storage block, the twentieth storage block, the twenty-first memory block, the twenty-second memory block, the twenty-third memory block, the twenty-fourth memory block and the twenty-fifth memory block.

Referring to FIG. 3 and FIG. 4, a first target voltage is applied to all word lines of the first memory block, a second target voltage is applied to all word lines of the second memory block, a third target voltage is applied to all word lines of the third memory block, a fourth target voltage is applied to all word lines of the fourth memory block, a fifth target voltage is applied to all word lines of the fifth memory block, a sixth target voltage is applied to all word lines of the sixth memory block, a seventh target voltage is applied to all word lines of the seventh memory block, an eighth target voltage is applied to all word lines of the eighth memory block, a ninth target voltage is applied to all word lines of the ninth memory block, a tenth target voltage is applied to all word lines of the tenth memory block, an eleventh target voltage is applied to all word lines of the eleventh memory block, a twelfth target voltage is applied to all word lines of the twelfth memory block, a thirteenth target voltage is applied to all word lines of the thirteenth memory block, a fourteenth target voltage is applied to all word lines of the fourteenth memory block, a fifteenth target voltage is applied to all word lines of the fifteenth memory block, a sixteenth target voltage is applied to all word lines of the sixteenth memory block, a seventeenth target voltage is applied to all word lines of the seventeenth memory block, an eighteenth target voltage is applied to all word lines of the eighteenth memory block, a nineteenth target voltage is applied to all word lines of the nineteenth memory block, a twentieth target voltage is applied to all word lines of the twentieth memory block, a twenty-first target voltage is applied to all word lines of the twenty-first memory block, a twenty-second target voltage is applied to all word lines of the twenty-second memory block, a twenty-third target voltage is applied to all word lines of the twenty-third memory block, a twenty-fourth target voltage is applied to all word lines of the twenty-fourth memory block, and a twenty-fifth target voltage is applied to all word lines of the twenty-fifth memory block.

The first target voltage is sub-feature data A1, the second target voltage is sub-feature data A2, the third target voltage is sub-feature data A3, the fourth target voltage is sub-feature data A4, the fifth target voltage is sub-feature data A5, the sixth target voltage is sub-feature data A6, the seventh target voltage is sub-feature data A7, the eighth target voltage is sub-feature data A8, the ninth target voltage is sub-feature data A9, the tenth target voltage is sub-feature data A10, the eleventh target voltage is sub-feature data A11, the twelfth target voltage is sub-feature data A12, the thirteenth target voltage is sub-feature data A13, the fourteenth target voltage is sub-feature data A14, the fifteenth target voltage is sub-feature data A15, the sixteenth target voltage is sub-feature data A16, the seventeenth target voltage is sub-feature data A17, the eighteenth target voltage is sub-feature data A18, the nineteenth target voltage is sub-feature data A19, the twentieth target voltage is sub-feature data A20, the twenty-first target voltage is sub-feature data A21, the twenty-second target voltage is sub-feature data A22, the twenty-third target voltage is sub-feature data A23, the twenty-fourth target voltage is sub-feature data A24, and the twenty-fifth target voltage is sub-feature data A25.

Referring to FIG. 3, the NAND flash memory further includes a data selector, an output terminal of the data selector is connected to the memory block, a first input terminal of the data selector is connected to a selected gate drain driver, a second input terminal of the data selector is connected to a word line driver, a third input terminal of the data selector is connected to a selected gate source driver, so as to transmit signals to the word line, the selected gate drain driver, and the selected gate source driver.

Referring to FIG. 2, FIG. 3 and FIG. 4, when the page buffer is used to sense the current of the memory block, all drain gating tubes in the first memory block through the twenty-fifth memory block are opened, a current sensed by the first page buffer corresponds to the sub-data $AW7 = A1 \times W1\_7 + A2 \times W2\_7 + A3 \times W3\_7 + A6 \times W4\_7 + A7 \times W5\_7 + A8 \times W6\_7 + A11 \times W7\_7 + A12 \times W8\_7 + A13 \times W9\_7$, a current sensed by the second page buffer corresponds to the sub-data $AW6 = A1 \times W1\_6 + A2 \times W2\_6 + A3 \times W3\_6 + A6 \times W4\_6 + A7 \times W5\_6 + A8 \times W6\_6 + A11 \times W7\_6 + A12 \times W8\_6 + A13 \times W9\_6$, and so on, a current sensed by the third page buffer corresponds to the sub-data AW5, a current sensed by the fourth page buffer corresponds to the sub-data AW4, a current sensed by the fifth page buffer corresponds to the sub-data AW3, a current sensed by the sixth page buffer corresponds to the sub-data AW2, a current sensed by the seventh page buffer corresponds to the sub-data AW1, and a current sensed by the eighth page buffer corresponds to the sub-data AW0. Thus, the sub-convolution result is $AW7 \times 27 + AW6 \times 26 + AW5 \times 26 + AW4 \times 24 + AW3 \times 23 + AW2 \times 22 + AW1 \times 21 + AW0 \times 20$.

Figure 5:
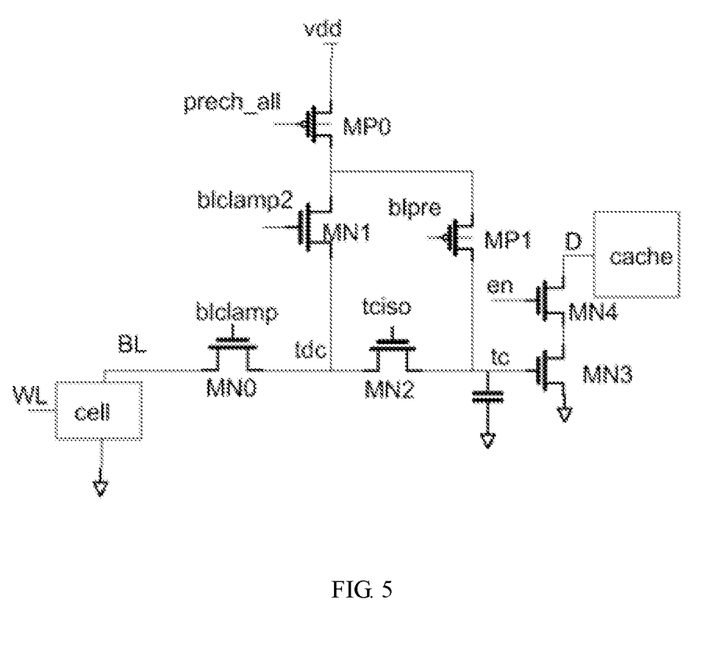
FIG. 5 is a schematic circuit diagram of a page buffer in some embodiments of the present disclosure.

FIG. 5 is a schematic circuit diagram of a page buffer in some embodiments of the present disclosure. Referring to FIG. 5, the page buffer includes a first PMOS transistor MP0, a second PMOS transistor MP1, a first NMOS transistor MN0, a second NMOS transistor MN1, a third NMOS transistor MN2, a fourth NOMS transistor MN3, a fifth NMOS transistor MN4, a capacitor C, and a cache. A source of the first PMOS transistor MP0 is connected to a supply voltage vdd, a gate of the first PMOS transistor MP0 is connected to a first control signal prech_all, a drain of the first PMOS transistor MP0 is connected to a drain of the second NMOS transistor MN1 and a source of the second PMOS transistor MP1, a gate of the second NMOS transistor MN1 is connected to a second control signal blclamp2, a gate of the second PMOS transistor MP1 is connected to a third control signal blpre, a source of the second NMOP transistor MN1 is connected to a drain of the first NMOS transistor MN0 and a source of the third NMOS transistor MN2, at a connecting point of tdc. A gate of the first NMOS transistor MN0 is connected to a fourth control signal blclamp, a source of the first NMOS transistor MN0 is connected to a bit line BL, a gate of the third NMOS tube MN2 is connected to a fifth control signal tciso, and a drain of the second PMOS transistor MP1 is connected to a gate of the fourth NMOS transistor MN3, one terminal of the capacitor C and a drain of the third NMOS transistor MN2, at a connecting point of TC. The other terminal of the capacitor C is grounded, a source of the fourth NMOS transistor MN3 is grounded, a drain of the fourth NMOS transistor MN3 is connected to a source of the fifth NMOS transistor MN4, a drain D of the fifth NMOS transistor MN4 is connected to cache, and a gate of the fifth NMOS transistor MN4 is connected to a sixth control signal en.

Figure 6:
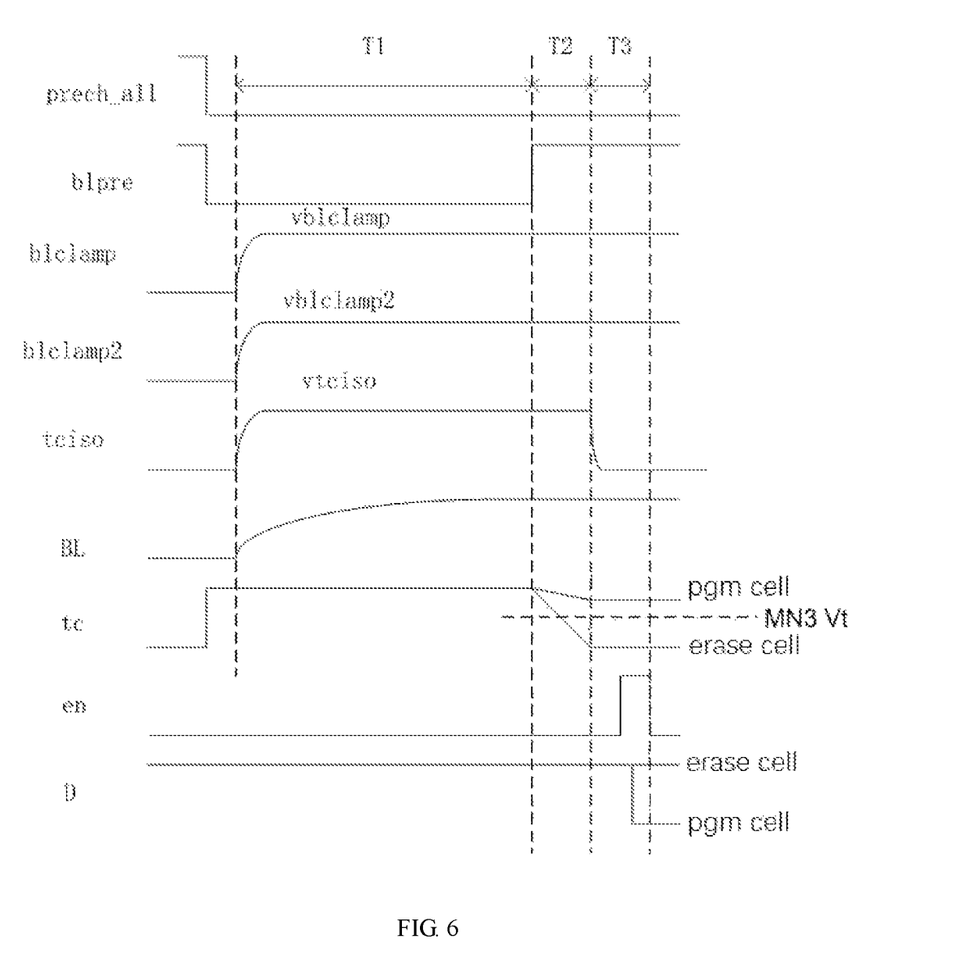
FIG. 6 is a timing diagram of a page buffer shown in FIG. 5 in some embodiments of the present disclosure.

FIG. 6 is a timing diagram of a page buffer shown in FIG. 5 according to some embodiments of the present disclosure. In FIG. 6, T1 denotes a first stage, T2 denotes a second stage, T3 denotes a third stage, MN3 Vt denotes a threshold voltage of the third NMOS transistor, a pgm cell denotes that a memory cell is in a programming state, erase cell denotes that the memory cell is in an erase state, vblclamp denotes a voltage when the fourth control signal is located at a high level, vblclamp 2 denotes a voltage when the second control signal blclamp 2 is located at a high level, vtciso denotes a voltage when the fifth control signal is located at a high level.

Figure 7:
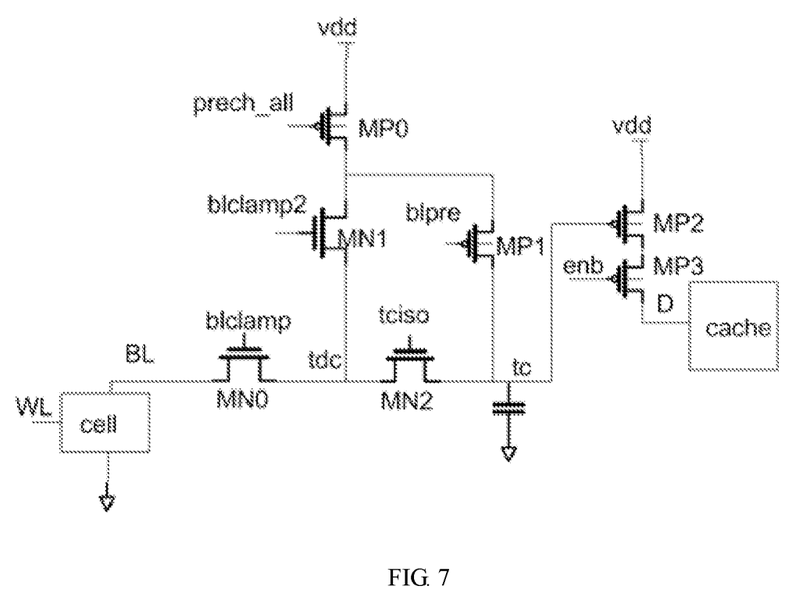
FIG. 7 is a schematic circuit diagram of a page buffer in another embodiment of the present disclosure.

FIG. 7 is a schematic circuit diagram of a page buffer according to another embodiment of the present disclosure. Referring to FIG. 7, the page buffer includes a first PMOS (P-Metal Oxide Semiconductor) transistor MP0, a second PMOS transistor MP1, a third PMOS transistor MP2, a fourth PMOS transistor MP3, a first NMOS (N-Metal Oxide Semiconductor) transistor MN0, a second NMOS transistor MN1, a third NMOS transistor MN2, a capacitor C, and a cache. A source of the first PMOS transistor MP0 is connected to a supply voltage vdd, a gate of the first PMOS transistor MP0 is connected to a first control signal pre-ch_all, a drain of the first PMOS transistor MP0 is connected to a drain of the second NMOS transistor MN1 and a source of the second PMOS transistor MP1, a gate of the second NMOS transistor MN1 is connected to a second control signal blclamp2, a gate of the second PMOS transistor MP1 is connected to a third control signal blpre, a source of the second NMOP transistor MN1 is connected to a drain of the first NMOS transistor MN0 and a source of the third NMOS transistor MN2, at a connecting point of tdc. A gate of the first NMOS transistor MN0 is connected to a fourth control signal blclamp, a source of the first NMOS transistor MN0 is connected to a bit line BL, a gate of the third NMOS tube MN2 is connected to a fifth control signal tciso, and a drain of the second PMOS transistor MP1 is connected to a gate of the third PMOS transistor MP2, one terminal of the capacitor C and a drain of the third NMOS transistor MN2, at a connecting point of tc. The other terminal of the capacitor C is grounded, a source of the third PMOS transistor MP2 is connected to a supply voltage vdd, a drain of the third PMOS transistor MP2 is connected to a source of the fourth PMOS transistor MP3, a drain D of the fourth PMOS transistor MP3 is connected to the cache, and the gate of the fourth PMOS transistor MP3 is connected to a sixth control signal enb.

Figure 8:
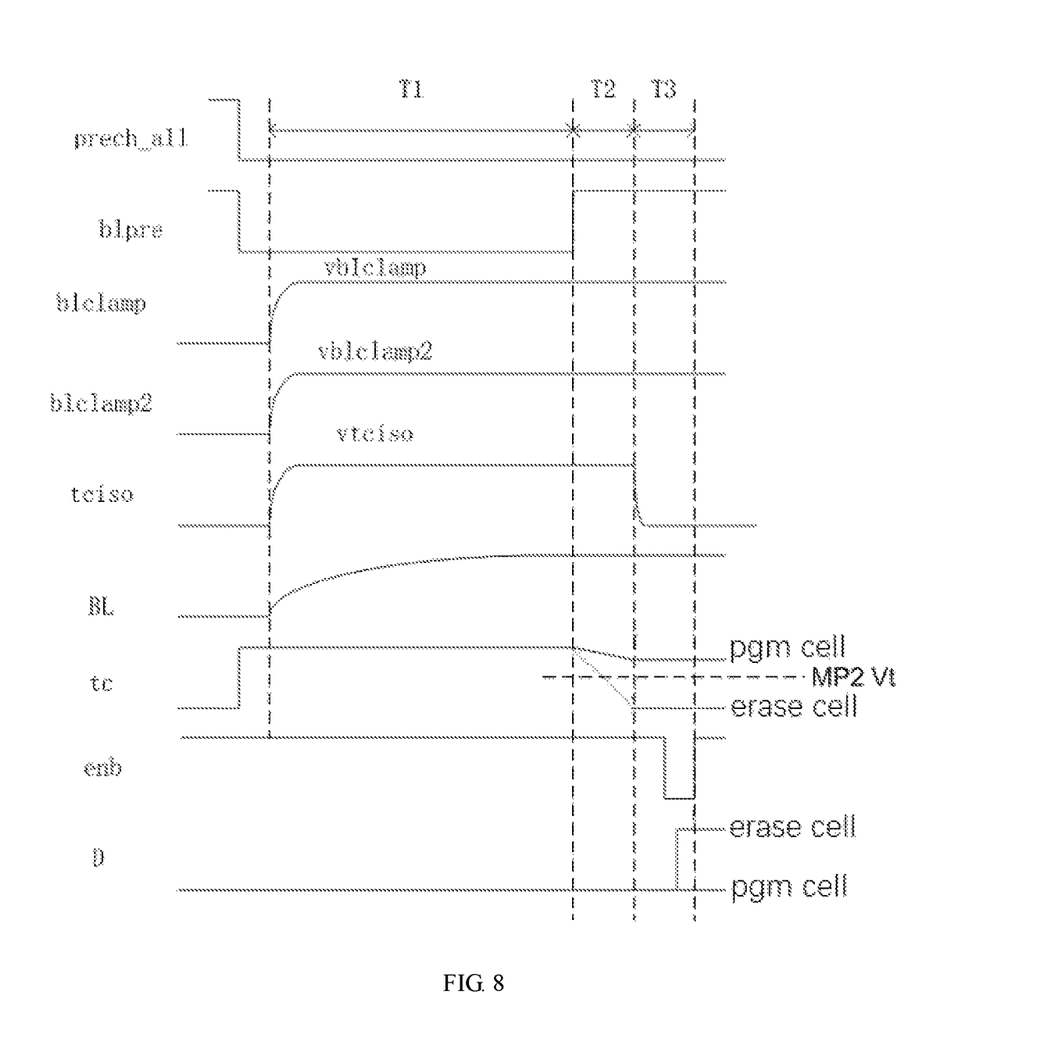
FIG. 8 is a timing diagram of a page buffer shown in FIG. 7 in some embodiments of the present disclosure.

FIG. 8 is a timing diagram of a page buffer shown in FIG. 7 according to some embodiments of the present disclosure. In FIG. 8, T1 denotes a first stage, T2 denotes a second stage, T3 denotes a third stage, MP2 Vt denotes a threshold voltage of the third PMOS transistor, pgm cell denotes that a memory cell is in a programming status, erase cell denotes that the memory cell is in an erase status, vblclamp denotes a voltage when the fourth control signal is located at a high level, vblclamp 2 denotes a voltage when the second control signal blclamp 2 is located at a high level, vtciso denotes a voltage when the fifth control signal is located at a high level.

In some embodiments, sensing the current of the memory block through the page buffer to obtain a convolution result includes: dividing sensing time of the page buffer into N sections; discharging a pre-charge voltage of the page buffer via the bit line until the pre-charge voltage of the page buffer is less than a threshold voltage, and recording the time as a m-th section; and obtaining sub-data according to M and N, where M and N are natural numbers greater than 0. Referring to FIG. 5, a voltage from a connecting point tc is the pre-charge voltage of the page buffer, and the threshold voltage is a threshold voltage of the fourth NMOS transistor. Each section prior to the M-th section denotes 0, and the M-th section and each section thereafter denote 1. In some embodiments, for example, when N is 10 and M is 5, the sub-convolution result is 0000111111.

In some embodiments, the method for a NAND flash memory to complete convolution operation of multi-bit data further includes a target voltage calibration step. The target voltage calibration step includes the following steps:

writing the threshold voltage into a memory cell matrix with a size of Y×Z in the NAND flash memory, where Y denotes the number of memory cells connected by one bit line, and Z denotes the number of memory blocks;

adjusting a word line voltage, making a measured average current of Y page buffers be X×Z, where the word line voltage is X, and the corresponding feature data is X; and obtaining the target voltage according to the word line voltage and the corresponding feature data.

Although the embodiments of the present disclosure have been described in detail above, it is apparent to those skilled in the art that various modifications and changes can be made to these embodiments. However, it should be understood that these modifications and variations are within the scope and spirit of the present disclosure as set forth in the claims. Moreover, the present disclosure described here may have other embodiments, and can be implemented or achieved through various ways.

What is claimed is:

1. A method for a NAND flash memory to complete convolution operation of multi-bit data, comprising the following steps:

S0: providing a NAND flash memory, wherein the NAND flash memory comprises a plurality of memory blocks and a plurality of page buffers, each memory block comprises a plurality of synaptic strings, a plurality of bit lines and a plurality of word lines, each synaptic string comprises a plurality of memory cells connected in series, the synaptic strings are connected to the bit lines in one-to-one correspondence, the word line is connected to all the synaptic strings, the page buffer is connected to all the memory blocks, and one of the bit lines is connected to only one of the page buffers;

S1: weight data comprising a plurality of pieces of sub-weight data, wherein the sub-weight data are m-bit data, m is an integer greater than or equal to 2, feature data comprising a plurality of pieces of sub-feature data, wherein one piece of sub-weight data corresponds to at least one piece of sub-weight data, the sub-feature data are in one-to-one correspondence with the memory blocks, the plurality of memory cells connected by the same word line is divided into a plurality of groups of memory cells, the sub-weight data are written into the plurality of groups of memory cells according to a corresponding relationship between the sub-weight data and the sub-feature data, wherein one group of memory cells is configured to only store one piece of sub-weight data, and one memory cell in one group of memory cells is configured to only store 1-bit data of the sub-weight data;

S2: applying a target voltage to the plurality of groups of memory cells via the plurality of word lines;

S3: sensing, by the plurality of corresponding page buffers, currents of the memory blocks to obtain a plurality of pieces of sub-data; and S4: processing the plurality of pieces of sub-data to obtain a convolution result.

2. The method for a NAND flash memory to complete convolution operation of multi-bit data according to claim 1, wherein writing the sub-weight data into the plurality of groups of memory cells according to a corresponding relationship between the sub-weight data and the sub-feature data comprises:

writing all sub-weight data corresponding to one piece of sub-feature data into different groups of memory cells of the memory blocks corresponding to the sub-feature data according to the corresponding relationship between the sub-weight data and the sub-feature data.

3. The method for a NAND flash memory to complete convolution operation of multi-bit data according to claim 2, wherein writing the sub-weight data into the plurality of groups of memory cells according to a corresponding relationship between the sub-weight data and the sub-feature data further comprises: writing the plurality of pieces of sub-weight data associated with a result into the plurality of groups of memory cells in which different memory blocks share the plurality of bit lines, and writing the same bit data of the plurality of pieces of sub-weight data into different memory cells connected to the same bit line, respectively.

4. The method for a NAND flash memory to complete convolution operation of multi-bit data according to claim 3, wherein the convolution result comprises a plurality of sub-convolution results, and processing the plurality of pieces of sub-data to obtain a convolution result comprises:
obtaining a sub-convolution result according to a plurality of pieces of associated sub-data and bit numbers of the plurality of pieces of corresponding sub-weight data.

5. The method for a NAND flash memory to complete convolution operation of multi-bit data according to claim 4, wherein obtaining a sub-convolution result according to a plurality of pieces of associated sub-data and bit numbers of the plurality of pieces of corresponding sub-weight data comprises:
multiplying the plurality of pieces of associated sub-data and corresponding bit number parameters to obtain a plurality of pieces of intermediate data, wherein the bit number parameter is $2^n$, and n is the bit number of the sub-weight data corresponding to the sub-data; and
adding the plurality of pieces of intermediate data to obtain the sub-convolution result.

6. The method for a NAND flash memory to complete convolution operation of multi-bit data according to claim 2, wherein the target voltage comprises a plurality of sub-target voltages which are in one-to-one correspondence with the sub-feature data, and applying a target voltage to the plurality of groups of memory cells through the plurality of word lines comprises:
applying the sub-target voltages corresponding to the sub-feature data to all memory cells of the memory blocks corresponding to the sub-feature data, and holding the sub-target voltages through the word lines.

7. The method for a NAND flash memory to complete convolution operation of multi-bit data according to claim 1, further comprising the following steps: serving the convolution result as new feature data, repeating Step S1 to Step S3, so as to achieve the next layer of convolution operation.

8. The method for a NAND flash memory to complete convolution operation of multi-bit data according to claim 1, wherein sensing, by the plurality of corresponding page buffers, currents of the memory blocks to obtain a plurality of pieces of sub-data comprises:
dividing sensing time of the page buffer into N sections;
discharging a pre-charge voltage of the page buffer via the bit line until the pre-charge voltage of the page buffer is less than a threshold voltage, and recording the time as an M-th section; and
obtaining sub-data according to M and N, wherein M and N are natural numbers greater than 0.

9. The method for a NAND flash memory to complete convolution operation of multi-bit data according to claim 1, further comprising a target voltage calibration step, which comprises the following steps:
writing the threshold voltage into a memory cell matrix with a size of Y×Z in the NAND flash memory, wherein Y denotes the number of memory cells connected by one bit line, and Z denotes the number of memory blocks;
adjusting a word line voltage, making a measured average current of Y page buffers be X×Z, wherein a word line voltage is X, and corresponding feature data is X; and
obtaining the target voltage according to the word line voltage and the corresponding feature data.

* * * * *